United States Patent
Hilt

(10) Patent No.: US 9,200,624 B2
(45) Date of Patent: Dec. 1, 2015

(54) MICROSYSTEMS FOR COMPRESSING OR FOR CONVERTING A PRESSURE DIFFERENCE INTO A DISPLACEMENT

(75) Inventor: Thierry Hilt, Barraux (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 388 days.

(21) Appl. No.: 13/988,783

(22) PCT Filed: Nov. 16, 2011

(86) PCT No.: PCT/EP2011/070248
§ 371 (c)(1),
(2), (4) Date: Jun. 13, 2013

(87) PCT Pub. No.: WO2012/069347
PCT Pub. Date: May 31, 2012

(65) Prior Publication Data
US 2013/0259715 A1  Oct. 3, 2013

(30) Foreign Application Priority Data

Nov. 22, 2010  (FR) ...................................... 10 59587

(51) Int. Cl.
*F04C 18/02* (2006.01)
*F04B 7/00* (2006.01)
(Continued)

(52) U.S. Cl.
CPC . *F04B 7/00* (2013.01); *B60C 23/04* (2013.01); *F04C 18/023* (2013.01); *F04C 25/00* (2013.01); *F04C 23/02* (2013.01); *F04C 2230/10* (2013.01); *F04C 2240/401* (2013.01); *F04C 2240/81* (2013.01); *F04C 2270/15* (2013.01)

(58) Field of Classification Search
CPC ............... F04B 19/006; F04B 18/0207; F04C 18/0207; F04C 18/0215; F04C 18/023; F04C 25/00; F04C 23/02; F04C 2230/10; F04C 7/00
USPC ...................................................... 417/410.5
See application file for complete search history.

(56) References Cited

U.S. PATENT DOCUMENTS 5,328,342 A * 7/1994 Ishii et al. ..................... 418/55.5
5,932,940 A 8/1999 Epstein et al.
(Continued)

FOREIGN PATENT DOCUMENTS

FR         2897486      8/2007
WO     WO96/41080   12/1996
(Continued)

*Primary Examiner* — Charles Freay
(74) *Attorney, Agent, or Firm* — Occhiuti & Rohlicek LLP

(57) ABSTRACT

A microsystem for converting pressure difference in fluid into mechanical displacement includes input and output nozzles, two interleaved parts, one of which is mobile part, between which the fluid flows. During displacement, the parts define an expanding fluid pocket that moves from the input nozzle to the output nozzle. The micro-system also includes top and bottom planes between which the mobile part is mounted for displacement relative to each plane, an overhanging distal portion along which the fluid flows, and a proximal portion mechanically linked to a plane via a link allowing only longitudinal translation of the proximal portion, and a reinforcement including a first side fastened to one of the planes and, a second side that is either fastened to or in sliding contact with the overhanging distal portion of the mobile part to limit its deformation in a transverse direction perpendicular to the longitudinal direction.

19 Claims, 8 Drawing Sheets

Figure 1:
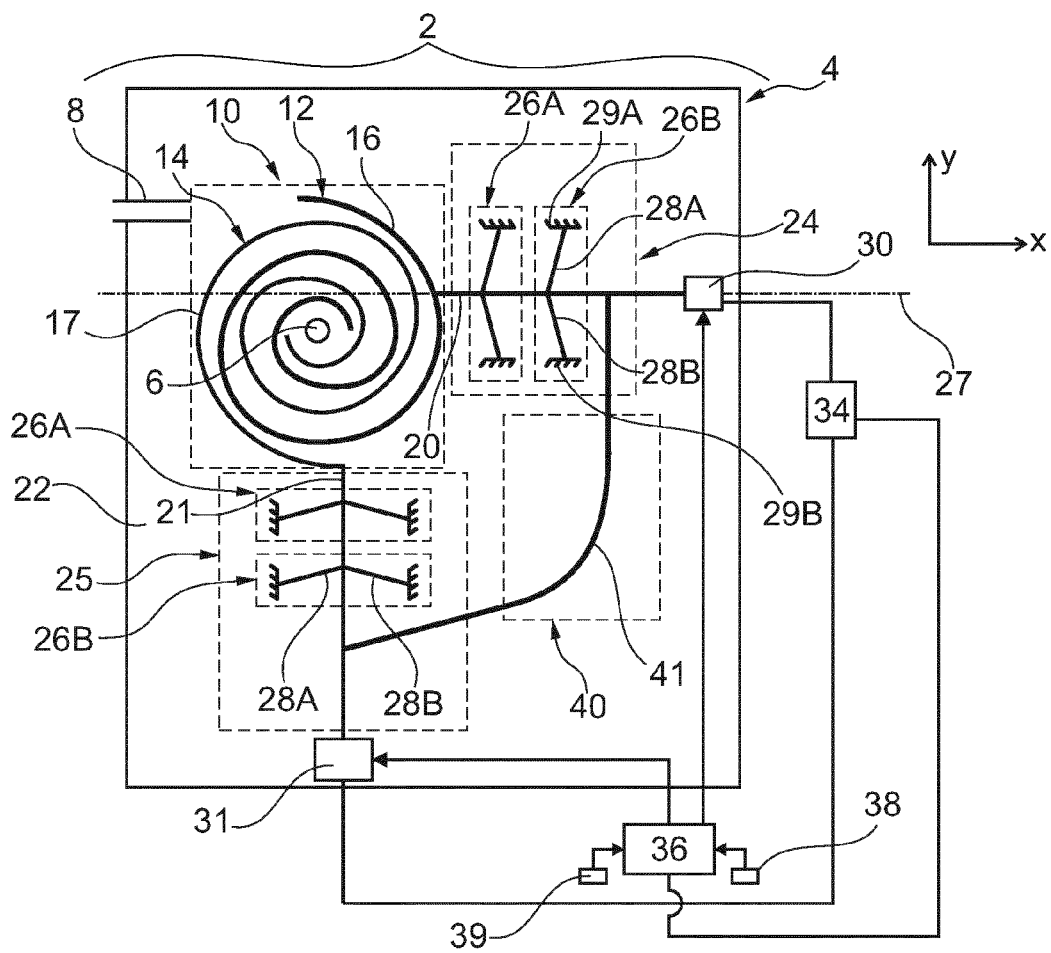

(51) Int. Cl.
  *B60C 23/04* (2006.01)
  *F04C 25/00* (2006.01)
  *F04C 23/02* (2006.01)

(56) References Cited

U.S. PATENT DOCUMENTS

| | | | | |
|---|---|---|---|---|
| 5,955,801 | A | * | 9/1999 | Romero et al. ......... 310/40 MM |
| 6,368,065 | B1 | * | 4/2002 | Hugenroth et al. ............. 417/53 |
| 8,186,981 | B2 | * | 5/2012 | Sugimoto et al. ............. 418/150 |
| 2004/0126254 | A1 | * | 7/2004 | Chen et al. ................. 417/423.1 |
| 2006/0010871 | A1 | | 1/2006 | Frechette et al. |
| 2006/0057004 | A1 | | 3/2006 | Koeneman |
| 2009/0028728 | A1 | * | 1/2009 | Zamudio ..................... 417/410.5 |
| 2012/0068474 | A1 | * | 3/2012 | Hilt ............................... 290/1 R |

FOREIGN PATENT DOCUMENTS

| | | |
|---|---|---|
| WO | WO03/056691 | 7/2003 |
| WO | WO2006/095039 | 9/2006 |
| WO | WO2007/082894 | 7/2007 |

* cited by examiner

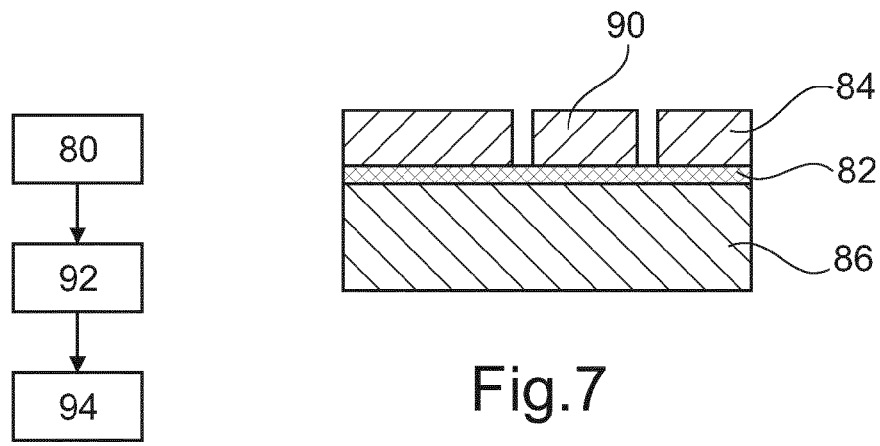
Fig.7
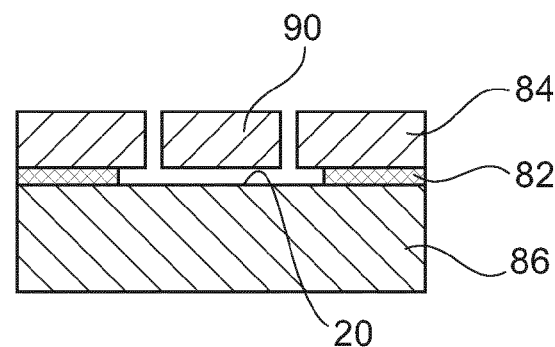
Fig.6
Fig.8
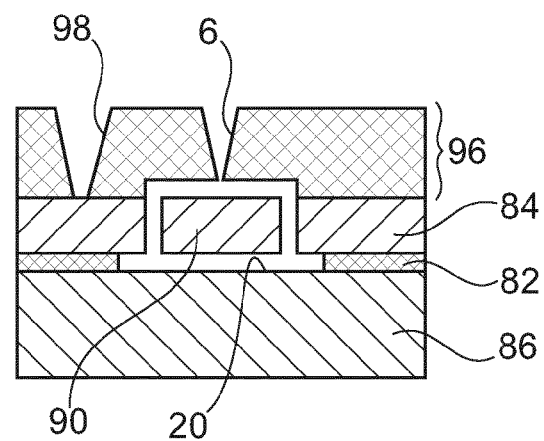
Fig.9

MICROSYSTEMS FOR COMPRESSING OR FOR CONVERTING A PRESSURE DIFFERENCE INTO A DISPLACEMENT

RELATED APPLICATIONS

Under 35 USC 371, this is the national stage entry of PCT/EP2011/070248, filed on Nov. 16, 2011, which claims the benefit of the priority date of FR 1059587, filed Nov. 22, 2010, the contents of which are incorporated herein by reference in their entirety.

FIELD OF DISCLOSURE

The invention relates to a microsystem for converting a pressure difference in a fluid into a mechanical displacement and a microsystem for compressing a fluid.

BACKGROUND

The microsystems are, for example, MEMS (micro-electromechanical systems). These microsystems differ from the macroscopic mechanical systems also by their fabrication method. These microsystems are produced by using the same collective fabrication methods as those used to produce microelectronic chips. For example, the microsystems are produced from slices of monocrystalline silicon or glass machined by photolithography and etching (for example by DRIE (Deep Reactive Ion Etching)) and/or structured by epitaxial growth and the deposition of metallic material.

With these fabrication methods, the microsystems are small and generally have machined pieces or parts of pieces with at least one dimension that is of micrometric magnitude. The micrometric dimension is generally less than 200 µm and, for example, between 1 and 200 µm.

For example, l'ONERA has developed microturbines to convert a fluidic flow into mechanical displacement. Another microsystem for producing the same function is, for example, disclosed in the application WO 03 056 691 or in the application WO 2006/095039.

The microsystems disclosed are capable of converting a pressure difference into a mechanical displacement. However, they present a certain number of drawbacks.

Some of these microsystems require a piece mounted with rotation, generally called rotor. The rotor rotates relative to another immobile piece, generally called stator. The rotor is, for example, a microturbine. Such a rotational movement of the rotor results in friction losses which can be significant, which reduces the energy efficiency of the microsystem. Energy efficiency should be understood to mean the ratio between the mechanical energy produced and the energy supplied to the microsystem in the form of a fluid flow rate or of a pressure difference.

Also, producing a microsystem equipped with a rotating part is complex and often requires numerous semiconductor wafers to be stacked in order to manage to fabricate it.

Finally, the known microsystems achieve a good energy efficiency only for high fluid flow rates. By contrast, for low or very low fluid flow rates, the efficiency is degraded.

Prior art is also known from:
U.S. Pat. No. 5,932,940A,
U.S. Pat. No. 6,368,065B1,
U.S.2004 126254A1,
U.S.2006/057004A1,
WO9641080A1,
U.S.2006/010871A1.

SUMMARY

To remedy these drawbacks, the applicant has developed a microsystem for converting a pressure difference in a fluid into a mechanical displacement according to the principle of an expansion valve, or for compressing a fluid comprising:
an input nozzle for the fluid and an output nozzle for the fluid,
at least two parts of which at least one is mobile, between which the fluid flows to pass from the input nozzle to the output nozzle by displacing said parts relative to one another, these parts being shaped, for example as spirals or as a circle, and interleaved one inside the other so that, during their displacement, they define at least one pocket of fluid of variable volume which moves away from the input nozzle to then meet the output nozzle,
a top plane and a bottom plane between which said parts are inserted, these planes containing between these parts the fluid which is flowing,
each mobile part being mounted to be able to be displaced relative to each of the top and bottom planes, each mobile part comprising:
an overhanging distal portion along which the fluid flows, this distal portion forming the shaped portion of the mobile part, and
a proximal portion mechanically linked to the bottom plane or top plane via a link allowing only a translational displacement of this proximal portion in a longitudinal direction, and
at least one reinforcement, on one side fastened to at least one of the planes and, on the other side, fastened to or in sliding contact with the distal portion of the mobile part to limit its deformation in a transversal direction at right angles to the longitudinal direction.

More specifically, the subject of the invention is a microsystem for converting a pressure difference into a mechanical displacement which comprises:
an input nozzle for the compressed fluid and an output nozzle for the expanded fluid,
at least two parts, at least one of which is mobile, between which the fluid flows to pass from the input nozzle to the output nozzle by displacing the parts relative to one another, these parts being shaped and interleaved one inside the other so that, during their displacement, they define at least one pocket of fluid which moves away from the input nozzle to then meet the output nozzle while at the same time increasing in volume,
a top plane and a bottom plane between which the mobile parts are inserted, these planes containing between these parts the fluid which is flowing,
each mobile part being mounted to be able to be displaced relative to each of the top and bottom planes, each mobile part comprising:
an overhanging distal portion along which the fluid flows, this distal portion forming the shaped portion of the mobile part, and
a proximal portion mechanically linked to the bottom plane or top plane via a link allowing only a translational displacement of this proximal portion in a longitudinal direction, and
at least one reinforcement, on one side fastened to at least one of the planes and, on the other side, fastened to or in sliding contact with the distal portion of the mobile part to limit its deformation in a transversal direction at right angles to the longitudinal direction.

The embodiments of this conversion microsystem can comprise the following feature:
the microsystem comprises at least one transducer suitable for converting the mechanical energy produced by the displacement of the mobile part into another energy.

Also the subject of the invention is a microsystem for compressing a fluid comprising:
an input nozzle for an expanded fluid and an output nozzle for the compressed fluid,
at least two parts, at least one of which is mobile, between which the fluid flows to pass from the input nozzle to the output nozzle by displacing the parts relative to one another, these parts being shaped and interleaved one inside the other so that, during their displacement, they define at least one pocket of fluid which moves away from the input nozzle to then meet the output nozzle while at the same time reducing in volume,
a top plane and a bottom plane between which the mobile parts are inserted, these planes containing between these parts the fluid which is flowing,
each mobile part being mounted to be able to be displaced relative to each of the top and bottom planes, each mobile part comprising:
an overhanging distal portion along which the fluid flows, this distal portion forming the shaped portion of the mobile part, and
a proximal portion mechanically linked to the bottom plane or top plane via a link allowing only a translational displacement of this proximal portion in a longitudinal direction,
at least one actuator designed to displace these mobile parts, and
at least one reinforcement, on one side fastened to at least one of the planes and, on the other side, fastened to or in sliding contact with the distal portion of the mobile part to limit its deformation in a transversal direction at right angles to the longitudinal direction.

The embodiments of this compression microsystem can comprise the following feature:
the microsystem comprises at least one transducer suitable for converting an energy external to the microsystem into a mechanical energy allowing for the displacement of the mobile parts.

The above microsystems exhibit a good energy efficiency even for very low fluid flow rates.

Furthermore, since the mobile parts define a pocket of fluid which moves away from the input nozzle during its displacement, there is no need to provide a non-return valve at the input nozzle.

Similarly, since the mobile parts define a pocket of fluid which is initially distant from the output nozzle, nor is there any need to provide a non-return valve at the output nozzle.

The fact that each mobile part is mounted to be able to be displaced relative to the bottom and top planes makes it possible to fabricate the two mobile parts interleaved one inside the other simultaneously. There is therefore no longer a need to separately fabricate the two mobile parts and then fit them one into the other.

Finally, the reinforcement makes it possible to limit the deformations of the distal portions under the effect of the pressure exerted by the fluid which flows between these distal portions. This is because, in a microsystem, the thickness of the distal portions is small. A small thickness should be understood to mean a thickness less than 1 mm and, typically, less than 0.5 mm or 250 µm. Because of this small thickness of the distal portions, they can be deformed significantly under the effect of the pressure exerted by the fluid which is flowing. If the deformation is too great in the transversal direction, one of the distal portions can block the displacement of the other distal portion by coming into mechanical contact therewith. The reinforcement limits this transversal deformation and therefore prevents the blocking of the microsystem for high pressures.

The embodiments of these microsystems can comprise one or more of the following features:
the distal portion of the mobile part has a housing inside which the reinforcement is received,
the reinforcement comprises at least one flexible blade extending mainly in the transversal direction and of which a proximal end is fastened with no degree of freedom to at least one of the top or bottom planes and a distal end is fastened with no degree of freedom to the distal portion of the mobile part;
the reinforcement comprises at least two flexible blades that are symmetrical relative to an axis parallel to the longitudinal direction and inclined on the same side of an axis parallel to the transversal direction to work only in pulling mode during displacements of the mobile part;
the reinforcement comprises at least one guide fastened with no degree of freedom to at least one of the top or bottom planes and extending at right angles to this plane and the distal portion has a planar face at right angles to the transversal direction and in sliding contact against the guide;
the two parts are mobile relative to the top and bottom planes in respective non-collinear longitudinal directions;
the microsystem comprises a mechanical phase-shifter inserted between the two mobile parts to introduce a phase shift between the reciprocal displacements of these two mobile parts;
the microsystem comprises at least one link between the parts, forming with these parts a system that is resonant at a resonance frequency, and a unit for controlling the displacement of each mobile part programmed to lock the frequency of the reciprocal movements of each mobile part onto the resonance frequency;
the link is a spring, each end of which is mechanically connected to one of the mobile parts.

The embodiments of these microsystems also offer the following advantages:
housing the reinforcement inside the mobile part makes it possible to limit the bulk of the microsystem,
using flexible blades to form the reinforcements simplifies the fabrication of the microsystem because these blades can be fabricated at the same time as the mobile parts,
using two flexible blades that are symmetrical to one another makes it possible to improve the guiding of the distal portion and to advantageously have these blades work in pulling mode to avoid any possible buckling,
the use of a mechanical phase-shifter limits the energy consumption of the microsystem compared to the case where this phase shift would be obtained only by controlling electromechanical transducers,
working at the resonance frequency makes it possible to reduce the energy consumed.

Figure 2:
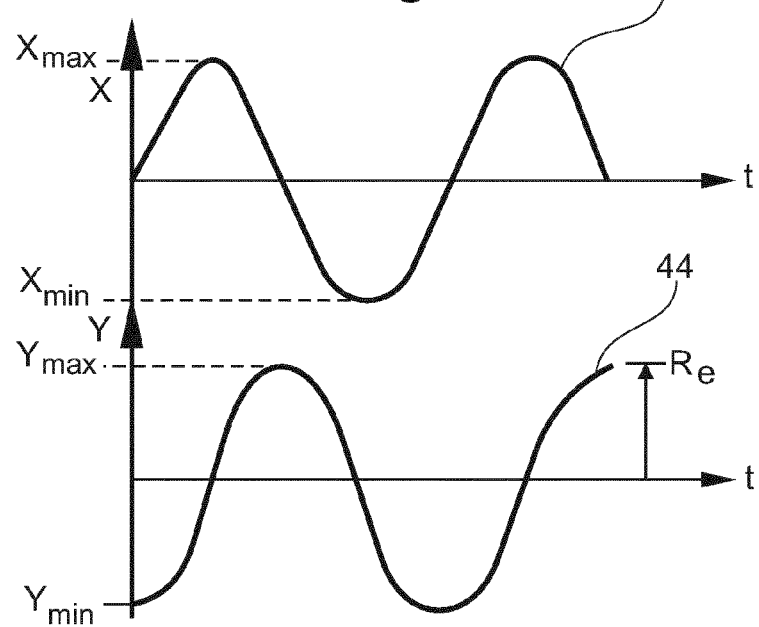
Figure 3:
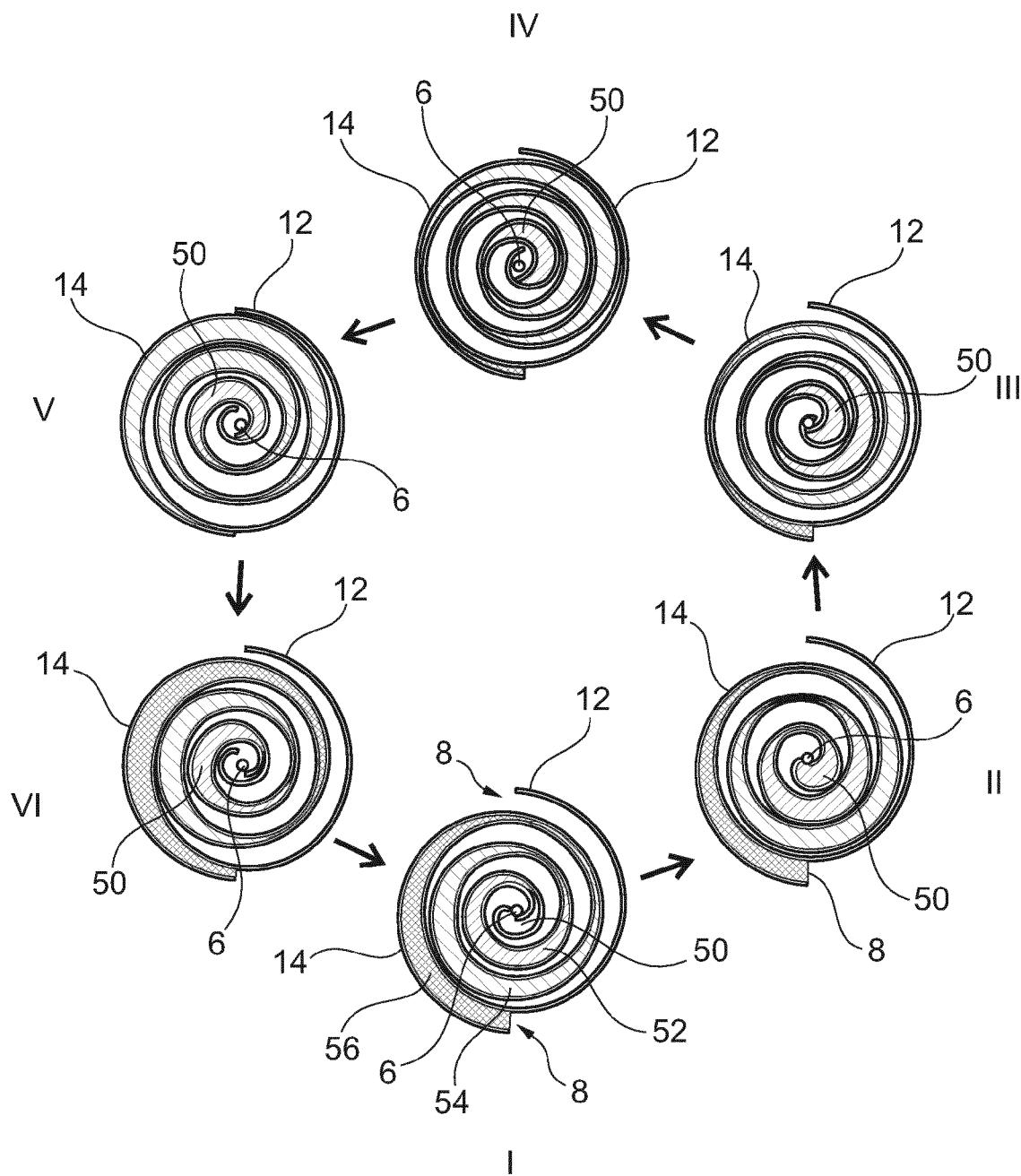
Figure 4:
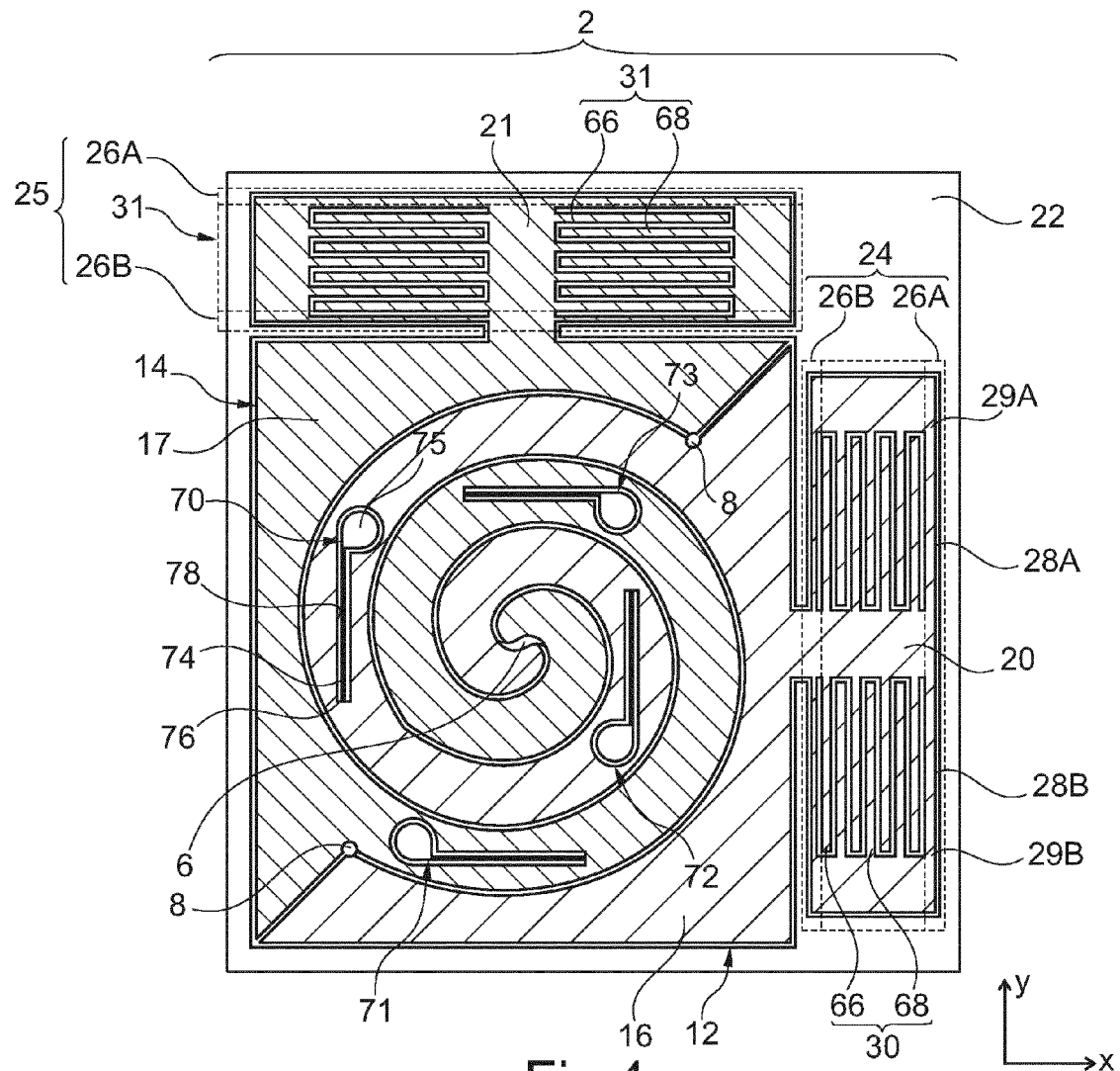
Figure 5:
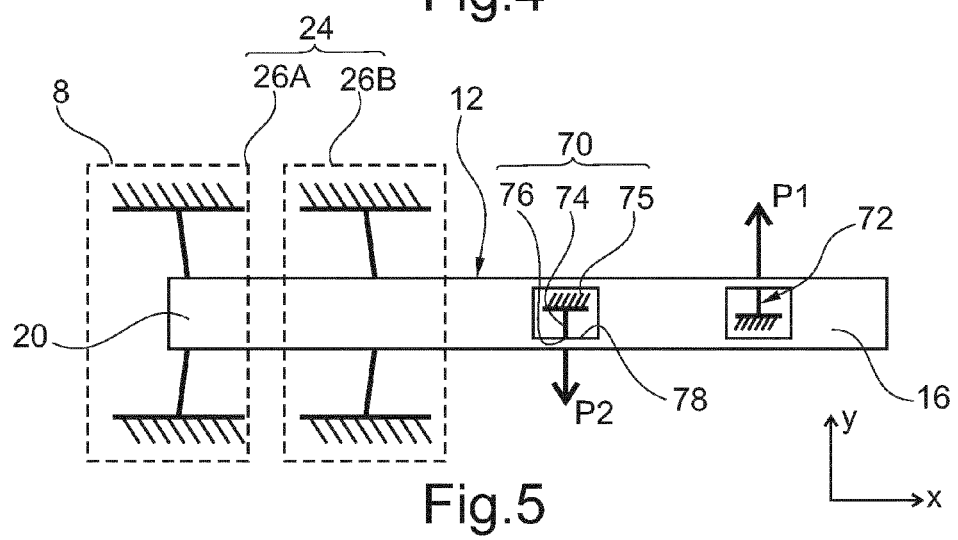
Figure 10:
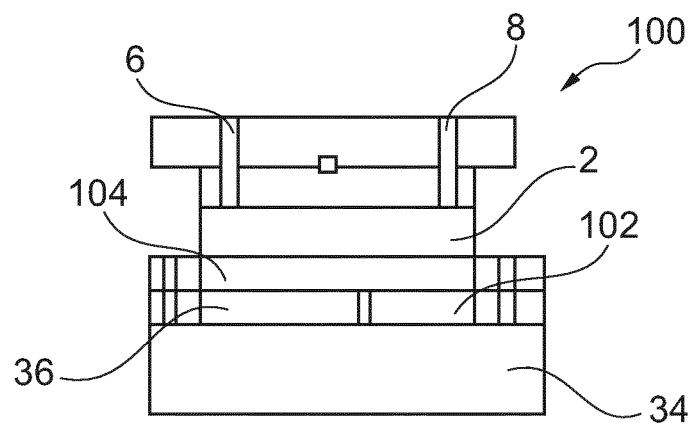
Figure 11:
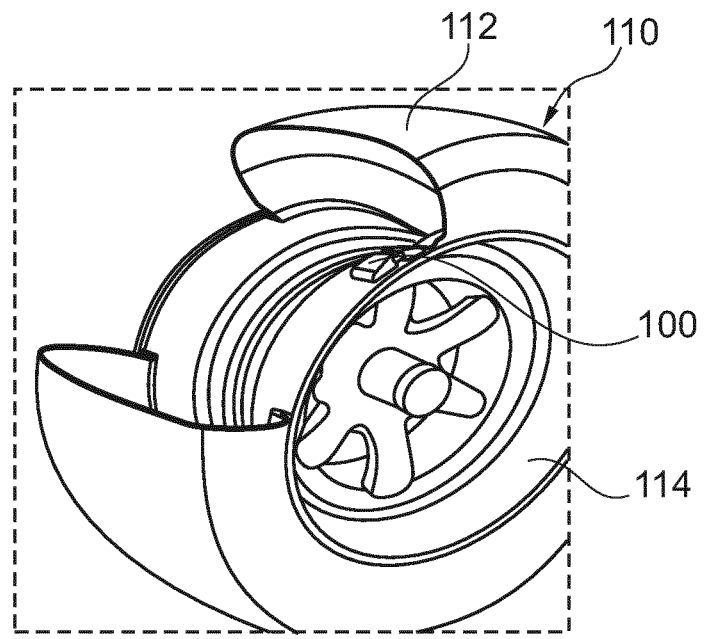
Figure 12:
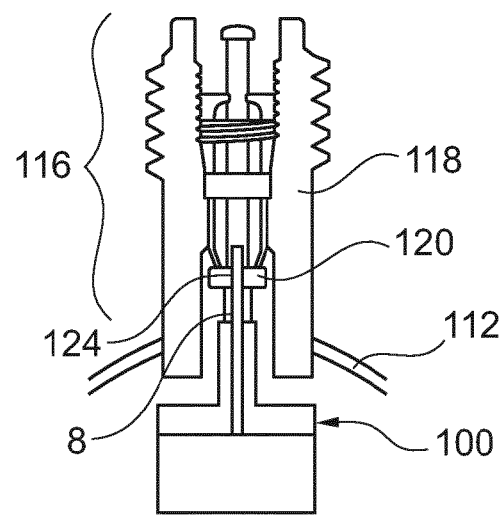
Figure 13:
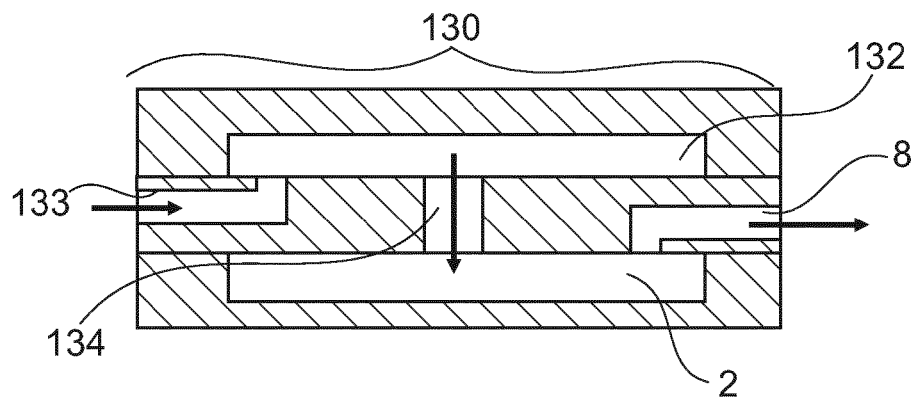
Figure 14:
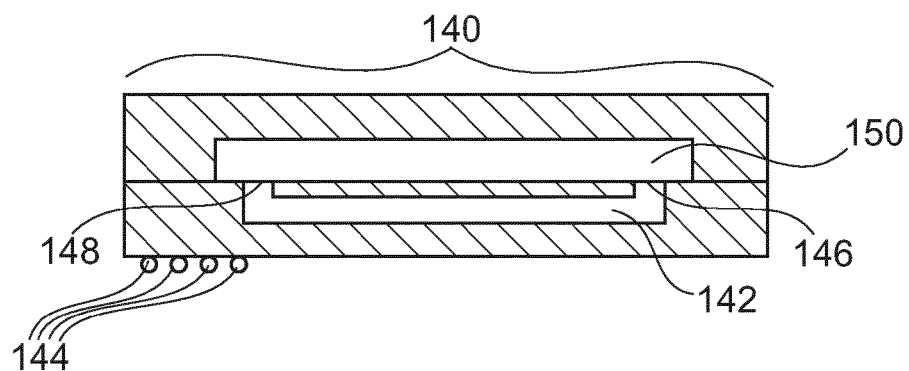
Figure 20:
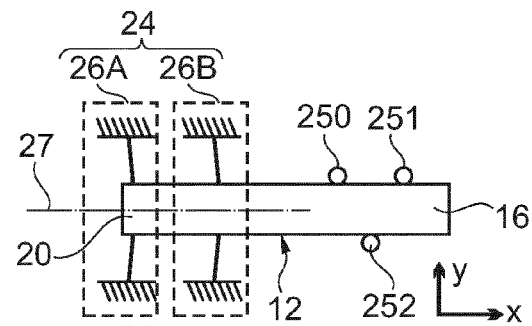
Figure 21:
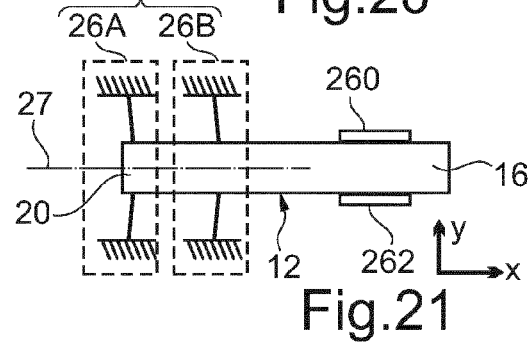
Figure 22:
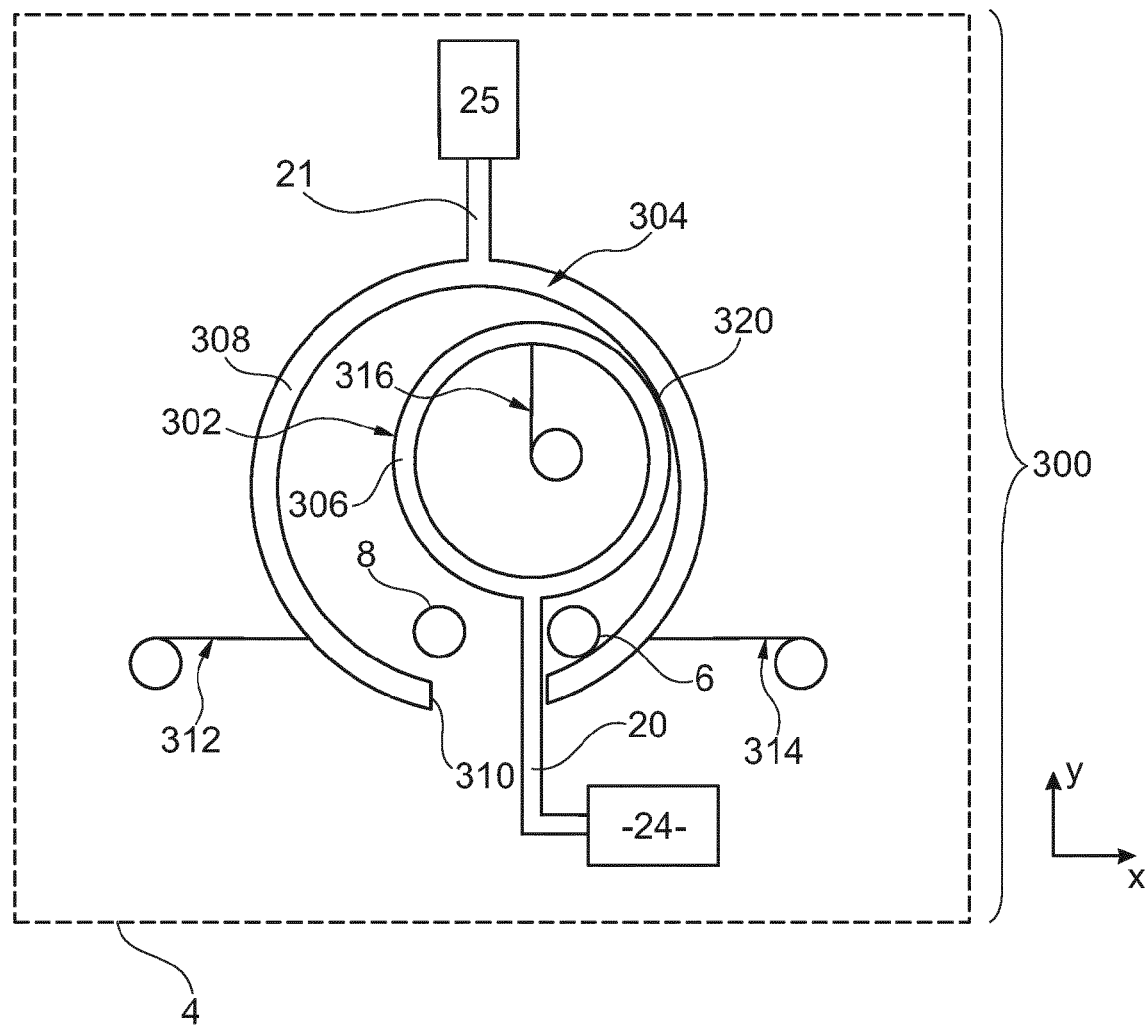

The invention will be better understood on reading the following description, given solely as a nonlimiting example and with reference to the drawings in which:

FIG. 1 is a schematic diagram of a microsystem for converting a pressure difference in a fluid into a mechanical displacement, FIG. 2 is a graph showing the displacement of mobile parts of the microsystem of FIG. 1 as a function of time, FIG. 3 is a schematic illustration of the operation of the microsystem of FIG. 1, FIG. 4 is a schematic illustration of a possible embodiment of the microsystem of FIG. 1, FIG. 5 is a schematic representation of just one of the mobile parts of the microsystem of FIG. 4, FIG. 6 is a flow diagram of a method for fabricating the microsystem of FIG. 1, FIGS. 7 to 9 are schematic illustrations in cross section of different steps of the method for fabricating the microsystem of FIG. 1, FIG. 10 is a schematic illustration of a pressure difference sensor incorporating the microsystem of FIG. 1, FIG. 11 is an illustration in partial cross section of a wheel incorporating the sensor of FIG. 10, FIG. 12 is a schematic illustration in cross section of a valve of the wheel of FIG. 11, FIG. 13 is a schematic illustration of a fuel cell incorporating a micromotor using the microsystem of FIG. 1, FIG. 14 is a schematic illustration in cross section of an electronic chip incorporating a compression microsystem similar to the microsystem of FIG. 1, FIGS. 15 to 21 are schematic illustration of different possible embodiments of a reinforcement of the microsystem of FIG. 4, and FIG. 22 is a schematic illustration of another possible embodiment for the mobile parts of a microsystem.

In these figures, the same references are used to designate the same elements.

Hereinafter in this description, the features and functions that are well known to the person skilled in the art are not described in detail.

DETAILED DESCRIPTION

FIG. 1 represents a microsystem 2 for converting a pressure difference in a fluid into a mechanical displacement. The fluid is a compressible fluid. For example, the fluid is a gas.

The microsystem 2 comprises a fluidically closed chamber 4 connected to the compressed fluid via an input nozzle 6 and fluidically connected to the expanded fluid via an output nozzle 8. The chamber 4 is hermetically sealed so that the expanded fluid in this chamber cannot escape through exits other than the nozzle 8.

Inside the chamber 4, the nozzle 6 is fluidically connected to a spiral expansion valve 10. The spiral expansion valve is also known as a "scroll" expansion valve.

The expansion valve 10 is formed in two parts 12 and 14 that are mobile relative to one another. The mobile parts 12 and 14 are shaped and articulated so that, during their displacement under the effect of the fluid accepted through the nozzle 6, they define at least one pocket of fluid which moves away from the nozzle 6 to then move towards the nozzle 8 while at the same time increasing in volume. For example, each mobile part 12, 14 comprises an overhanging distal portion, respectively 16, 17, and a proximal portion, respectively 20, 21.

The distal portions 16, 17 are shaped as a spiral and are interleaved one inside the other. Each spiral comprises at least one turn or even several turns to define a plurality of pockets of fluid which are displaced at the same time from the nozzle 6 to the nozzle 8. In this embodiment, the number of turns of each spiral is greater than or equal to 3. Here, the proximal portion forms a rectangular beam.

The mobile portions 12, 14 are housed between a bottom plane 22 and a top plane 96 (FIG. 9) that are horizontal. These planes extend parallel in directions X and Y that are orthogonal in FIG. 1. These top and bottom planes retain the fluid inside pockets between the mobile parts 12, 14. Here, each of the mobile parts 12, 14 is displaced relative to each of these bottom and top planes. To this end, the mobile parts 12, 14 are simultaneously in planar contact on the bottom and top planes. There is therefore a gap between the bottom and top planes and the mobile parts 12, 14. This gap is narrow enough to limit the fluid leaks through it. Typically, this gap is less than 10 µm and, preferably, less than 1 µm or 0.1 µm.

Each proximal portion 20, 21 is directly mechanically connected via articulations or mechanical links, respectively 24 and 25, to the same bottom plane 22. Here, the term "articulation" should be understood to be a mechanical link allowing two securely attached parts to retain a certain movement capability relative to one another. There is therefore not necessarily a pivot link. On the contrary, in this embodiment, the links 24 and 25 allow only a translational displacement of the proximal portions 20, 21 in, respectively, the directions X and Y.

Preferably, the links 24 and 25 are elastic so as to automatically return the corresponding distal portion to a rest position in the absence of external stress.

The link 24 comprises two slide links 26A and 26B which share the same sliding axes 27. The axis 27 is parallel to the direction X.

The slide links 26A and 26B are identical. Thus, only the link 26A is described in more detail.

Here, the slide link 26A is formed by two flexible blades 28A, 28B arranged symmetrically relative to the axis 27. Furthermore, they extend essentially at right angles to the axis 27. Distal ends of each of the blades 28A, 28B are fastened with no degree of freedom to the proximal portion 20. Proximal ends 29A and 29B of these blades are anchored, with no degree of freedom, on the plane 22. These proximal ends 29A and 29B form anchor points.

The displacement of the proximal portion 20 along the axis 27 is made possible by the elastic deformation of the blades 28A and 28B. To this end, the stiffness $K_y$ of the blades 29A, 29B in the direction Y is at least ten times, and preferably a thousand times, greater than the stiffness $K_x$ of these blades in the direction X.

So as not to hamper the displacement of the proximal portion 20 along the axis 27, the moment of inertia of this proximal portion is, typically, at least a thousand times greater than the moment of inertia of each blade 28A, 28B. For example, this is obtained by choosing the thickness $e_l$ of the blades 28A, 28B in the direction X at least ten times less than the thickness $e_{pp}$ of the proximal portion 20 in the direction Y. For example the thickness $e_l$ is less than or equal to 50 µm and, preferably, to 20 µm, whereas the thickness $e_{pp}$ is greater than 500 µm. The length of the proximal portion 20 is typically greater than 500 µm and, preferably, than 1 mm.

The combination of the slide links 26A and 26B forms what is known as a "double-parallelogram".

The travel of the displacement of the proximal portion 20 along the axis 27 is between 20 and 100 µm. Here, it is of the order of 40 µm.

For example, the links 24 and 25 are identical except that the sliding axis of the slide links of the link 25 is parallel to the direction Y. The link 25 is not described here in more detail.

Each mobile part 12, 14 is also mechanically connected to a respective electromechanical transducer 30, 31. Each electromechanical transducer is suitable for converting the mechanical movement of the mobile part into electrical energy.

Each of these transducers 30, 31 is connected at the output to an electrical energy storage device 34. For example, the device 34 is a capacitor.

Here, the transducers 30 and 31 are electromechanical transducers that can be controlled so as to set the quantity of mechanical energy converted into electrical energy. They therefore also fulfill the function of controllable damper.

These transducers 30 and 31 are controlled by a control unit 36. The unit 36 is connected to sensors 38 and 39 of a physical quantity representative of the electrical power produced, respectively, by the transducers 30 and 31. The sensors 38 and 39 also make it possible to measure the phase of the electrical power produced.

A mechanical phase shifter 40 is mechanically connected between the proximal portions 20, 21 of the mobile parts 12 and 14. The function of this phase-shifter 40 is to mechanically assist in producing a phase-shift of $\pi/2$ radians between the oscillation (reciprocal) movements of the mobile parts 12 and 14. Here, this phase-shifter 40 is formed by a spring 41 mechanically connected to the proximal portions 20, 21. For example, this spring 41 is a spring blade. This spring 41 forms, with the two mobile parts 12 and 14, a resonant system for a resonance frequency. The resonance frequency is reached when the phase-shift between the oscillation movements of the mobile parts 12, 14 is $\pi/2$ radians. At the resonance frequency, the energy efficiency of the microsystem 2 is maximum.

The unit 36 is suitable for controlling the transducers 30 and 31 to work at the resonance frequency. For example, based on information measured by the sensors 38 and 39, the unit 36 calculates the phase-shift between the oscillation movements of the mobile parts 12 and 14 and locks this phase-shift onto the value $\pi/2$.

To limit the energy consumed by the microsystem 2 in its operation, the unit 36 is itself powered from the electrical energy produced by the transducers 30 and 31. To this end, for example, the unit 36 is electrically connected to the electrical energy storage device 34.

FIG. 2 represents the trend over time of the displacements of the mobile parts 12, 14, respectively, in the directions X and Y. More specifically, the curves 44 and 46 represent the displacements, respectively, of the mobile parts 14 and 12. These displacements are sinusoidal and phase-shifted relative to one another by $\pi/2$ radians.

In standing operation, each mobile part describes an oscillation or reciprocal movement between two extreme positions denoted $X_{max}$ and $X_{min}$ for the mobile part 12 and $Y_{max}$ and $Y_{min}$ for the mobile part 14 in FIG. 2.

The displacement of the mobile parts 12, 14 defines a plurality of pockets of fluid which are displaced circularly from the nozzle 6 to the nozzle 8 while increasing in volume. More specifically, each pocket of fluid is displaced by revolving around, and, at the same time, moving away from, the nozzle 6.

FIG. 3 shows in more detail the displacement of a pocket 50 of fluid from the nozzle 6 to the nozzle 8.

Initially (state I), the pocket 50 is in fluidic communication with the nozzle 6. This pocket 50 is therefore filled with compressed fluid. Then (state II), the mobile parts 12 and 14 are displaced relative to one another to fluidically isolate this pocket 50 from the nozzle 6.

Then, as the successive states (state III to state VI) illustrate, the pocket 50 is displaced from the nozzle 6 to the nozzle 8 by describing a spiral movement about the nozzle 6. More specifically, after the mobile parts 12 and 14 have each performed a complete reciprocal movement, the pocket 50 is passed from the position represented in the state I to the position 52 represented in the state I. It has therefore performed a complete revolution around the nozzle 6.

Here, given that the distal portions 16, 17 in spiral form are wound a plurality of times around the nozzle 6, during the next cycle of oscillations of the mobile parts 12 and 14, the pocket 50 performs a new complete revolution around the nozzle 6 but moving a little further away therefrom. More specifically, after a new complete revolution, the pocket 50 occupies the position 54 (state I). Finally, in its last revolution, the pocket 50 occupies the position 56 (state I). In the state 56, the pocket is in fluidic communication with the nozzle 8, which enables the expanded fluid to escape.

Here, the mobile parts 12 and 14 are shaped to define simultaneously at least two pockets, and preferably at least six pockets, which are displaced at the same time from the nozzle 6 to the nozzle 8 while increasing in volume. In the particular case represented in FIG. 3, the mobile parts 12 and 14 are shaped to define six pockets of fluid which are displaced simultaneously from the nozzle 6 to the nozzle 8.

It will therefore be understood that, when the fluid expands in the expansion valve 10, the energy of this expansion is converted into a mechanical displacement of the mobile parts 12 and 14. In the particular case represented in FIG. 1, this mechanical displacement is converted by the transducers 30 and 31 into electrical energy.

FIG. 4 represents an exemplary implementation of the microsystem 2. In this example, the phase-shifter 40 is omitted and the energy storage device 34, the control unit 36 and the sensors 38, 39 are not represented. The mobile parts 12, 14 have been shaded in different directions to improve the legibility of the figure.

In this embodiment, the transducers 30, 31 are implemented in the form of variable capacitance capacitors to convert the mechanical energy produced by the displacement of the mobile parts 12, 14 into electrical energy. The conversion of mechanical energy into electrical energy using variable capacitors is well known. For example, it is used in the patent applications WO2007 082 894 and FR2 897 486. Thus, this conversion mechanism will not be described in detail.

For example, the transducers 30 and 31 are identical apart from their placement. Thus, only the transducer 30 is described in more detail. Here, the transducer 30 comprises a capacitor produced using interdigital combs. More specifically, an armature 66 of the capacitor is fastened with no degree of freedom to the proximal portion 20. Another armature 68 of this capacitor is fastened with no degree of freedom to the plane 22. Thus, when the proximal portion 20 is displaced, this modifies the capacitance of the capacitor, which is then exploited to convert the mechanical energy into electrical energy. Preferably, at least one of the armatures of the capacitor comprises electrets. In practice, this enables the transducer 30 to begin producing electrical energy without the prior addition of electrical energy from an external electrical energy source.

The microsystem 2 also comprises reinforcements for guiding the displacement of each distal portion 16, 17 in its longitudinal direction. The longitudinal directions of the mobile parts 12, 14 correspond, respectively, to the directions X and Y. More specifically, each of these reinforcements limits the deformation of the distal portion in a direction transversal to the longitudinal direction without blocking the degree of freedom in translation of this distal portion. In practice, given that the thickness of the distal portions is small, they can be deformed under the effect of the pressure exerted by the fluid which is flowing between the distal portions 16 and 17. More specifically, in the case described here, the pressure of the fluid between the distal portions 16 and 17 tends to unwind the spirals. If the pressure is sufficiently great, this deformation of the distal portions can result in a mechanical blocking of the mobile parts 12 and 14. Such blocking occurs if the distal portions 16 and 17 come into mechanical contact with one another under the effect of this deformation.

Here, the microsystem 2 comprises four reinforcements 70 to 73. The reinforcements 70, 72 and 71, 73 limit the lateral deformations, respectively, of the distal portions 16 and 17.

More specifically, the reinforcement 70 limits the deformations of the distal portion 16 in the direction opposite to the direction Y whereas the reinforcement 72 limits this deformation in the direction Y.

In this embodiment, the reinforcements 70 and 72 are arranged on either side of the orifice 6.

The structure of the reinforcements 70 and 72 is identical, so only the structure of the reinforcement 70 is now described in more detail.

The reinforcement 70 is produced using a flexible blade 74 (represented by a bold line in the figure) of which a proximal end 75 is directly anchored with no degree of freedom to the plane 22. A distal end 76 opposite to the proximal end 75 is directly anchored with no degree of freedom to the distal portion 16.

The blade 74 extends essentially in the direction Y. This blade 74 is elastically deformable. The expression "elastically deformable" is used here to mean the fact that this blade 74 does not suffer any plastic deformation in the normal operation of the microsystem 2. To this end, the stiffness $K_y$ of the blade 74 in the direction Y is at least ten times, and preferably at least a thousand times, greater than the stiffness $K_x$ of the blade in the direction X. The stiffness $K_y$ is proportional to the thickness of the blade 74 in the direction X and to the Young's modulus of the material used to produce this blade 74. For example, here, the thickness of the blade 74 in the direction X is less than 100 μm and, preferably, less than 50 or 25 μm. In this example, the thickness of the blade 74 is equal to 20 μm. Preferably, the Young's modulus of the material used to produce the blade 74 is greater than 10 or 50 GPa. Typically, the material used is silicon, but other materials could obviously be suitable.

The length of the blade 74 in the direction Y is several tens and, preferably, several hundreds of times greater than its thickness. For example, the length of the blade 74 is greater than 200 or 300 μm.

Moreover, the moment of inertia of the blade 74 is a hundred times and, preferably, at least a thousand times less than the moment of inertia of the mobile part 12 so as not to hamper the translational displacement of this mobile part 12. Such a difference between the moments of inertia of the blade 74 and of the mobile part 12 is also obtained by choosing the thickness of the blade 24 at least ten times less than the average thickness of the distal portion 16. The thickness of the distal portion 16 is measured in a radial direction relative to the center of the spiral. This center is here merged with the center of the orifice 6.

In this embodiment, the blade 74 is received inside a housing 78 hollowed out in the thickness of the distal portion 16. Typically, this housing 78 is a through housing for anchoring the blade 74 directly on the plane 22.

The reinforcements 71 and 73 are identical, respectively, to the reinforcements 70 and 72, except that they are angularly offset by 90° and received in housings hollowed out in the distal portion 17.

The operation of the reinforcements will now be described in more detail with regard to FIG. 5. FIG. 5 represents a schematic plan view of the mobile part 12. To simplify this illustration, the distal portion 16 is represented in the form of a rectilinear bar. The arrows P1 and P2 represent the force exerted by the fluid which is flowing along this distal portion 16. These forces P1 and P2 tend to unwind the spiral. These forces therefore tend to deform the distal portion in a transversal direction. The reinforcements 70 and 72 are arranged inside the portion 16 so as to oppose these transversal deformations.

More specifically, the blade 74 is stretched almost not at all in the direction Y. The distal end 76 of each blade 74 therefore describes a circular arc centered on the proximal end 75 when the mobile part 12 is displaced in translation in the direction X. However, such guidance of the distal portion 16 by the reinforcements 70, 72 remains a linear guidance. In practice, it is assumed here that the guidance is linear in the direction X if the amplitude of the displacement of the end 76 in the direction Y is at least a hundred times and, preferably, at least a thousand times lower than the amplitude of its displacement in the direction X when the mobile part 12 is displaced in translation in this direction X.

An exemplary method for fabricating the microsystem 2 will now be described with regard to the method of FIG. 6 and using the illustrations of FIGS. 7 to 9.

Initially, in a step 80, a plate comprising a sacrificial intermediate layer 82 is etched. Typically, this plate is an SOI (Silicone On Insulator) plate. Thus, this plate comprises, in addition to the sacrificial layer 82, on one side, a layer of silicon 84 and on the other side a layer of insulator 86. In the step 80, the mobile parts 12, 14, the links 24, 25, the mobile armatures 66 of the transducers 24, 25 and the reinforcements 70-73 are simultaneously etched in the same layer 84. In FIG. 6, the mobile parts 12, 14 and the armatures 66 that are thus etched are represented in the form of a block 90. The block 90 rests on the layer 82.

Then, in a step 92, the layer 82 situated below the block 90 is eliminated. For example, a chemical attack is used to eliminate the sacrificial layer. From this moment, the mobile parts 12, 14 and the armatures 66 can be displaced in translation relative to the plane 22 formed by the top face of the layer 86 (see FIG. 8).

Then, in a step 94, a cap 96 is produced and this cap is assembled on top of the layer 84. This cap 96 constitutes the top plane intended to contain the fluid between the mobile parts 12, 14. For example, the cap 96 is made of glass. The nozzles 6 and 8 are produced in this cap 96. Only the nozzle 6 has been represented in FIG. 8.

Holes for accessing the layer 84 are also produced in the cap 96 in order to electrically connect the transducers 30 and 31 to the control unit 36 and to the energy storage device 34. In FIG. 8, only one hole 98 for accessing the layer 84 has been represented.

It will be noted that the thickness of the layer 82 and the space between the cap 96 and the block 90 have been exaggerated in FIGS. 7 to 9 in order to show the gap which exists between the mobile parts 12, 14 and, respectively, the bottom or top plane. In practice, the thickness of the layer 82 and the space between the cap 96 and the block 90 are small enough for the fluid which expands in the expansion valve 10 to remain contained between the moving parts 12 and 14.

The microsystem 2 has many possible applications.

For example, FIG. 10 represents a pressure difference sensor 100 produced from the microsystem 2. The latter is dimensioned for the pressure difference between the nozzles 6 and 8 to be dependent on the mechanical energy produced by the displacements of the mobile parts 12 and 14. Furthermore, given that the electrical energy produced by the transducers 30 and 31 is proportional to the mechanical energy received, this electrical energy is also dependent on the pressure difference between the nozzles 6 and 8. It is this property of the microsystem 2 which is used to produce the sensor 100.

The sensor 100 comprises the energy storage device 34, the control unit 36 and the microsystem 2. It also comprises a circuit 102 for managing the charging and the discharging of the device 34 and a radio transmitter 104 suitable for communicating information representative of the pressure difference between the nozzles 6 and 8 to a remote radio receiver.

For example, the circuit 100 triggers the sending of a characteristic signal via the transmitter 104 as soon as the charge of the device 206 exceeds a predetermined threshold $F_1$. Thus, the time which elapses between two transmissions is proportional to the measured pressure difference. It is therefore possible, from the data received, to deduce therefrom the pressure difference between the nozzles 6 and 8.

Here, the threshold $F_1$ is set so as to allow the transmitter 104 to be powered so that the latter transmits the characteristic pulse. Thus, in this embodiment, the sensor 100 does not need any external power source to operate. In practice, the only energy source it uses is the pressure difference which exists between the nozzles 6 and 8.

FIG. 11 represents a wheel 110 equipped with the sensor 100. The wheel 110 comprises a tire 112 inside which compressed air is contained. This tire 112 is mounted on a rim 114. The sensor 100 is placed inside the tire 112 which serves as a protective jacket for it.

To operate, the nozzle 8 has to be fluidically connected to the outside of the tire 112.

FIG. 12 represents a possible example of mounting of the sensor 100 inside the tire 112 to produce this. More specifically, the tire 112 includes a valve 116 through which the wheel 110 can be inflated. Conventionally, this valve consists of a tubular body 118 fastened with no degree of freedom to the tire 112 and a mobile valve 120. This valve 120 can be displaced between a rest position in which it hermetically seals the tire and an active position in which it allows compressed air to be introduced into the tire 112.

Here, a hole 124 is hollowed out through the valve 120 to allow the nozzle 8 to pass through this valve 120 and thus connect it to the outside air.

In this embodiment, the sensor 100 is fastened with no degree of freedom to the valve 120.

Thus, when the valve 120 is in its rest position, the compressed air leaks through the sensor 100 and the hole 124. The flow rate of the air leak is very low, that is to say less than 1 mL/s. For example, here, the hole 124 is dimensioned so as to allow an air leak only less than 100 μL/s and preferably less than or equal to 10 μL/s.

With such a flow rate of 100 μL/s, the leak produced through the valve 120 represents, for a tire in which the volume of air is equal to $3.94 \times 10^{-2}$ m$^3$, a pressure drop of 8 mBar after six months, which is negligible. Thus, the sensor 100 can operate for more than six months without in any way requiring the owner of the vehicle to re-inflate the tire 110.

FIG. 13 represents a fuel cell 130 equipped with a micromotor incorporating the microsystem 2. The micromotor also incorporates a compression microsystem 132. For example, this microsystem 132 is identical to the microsystem 2 except that it is controlled to compress an expanded fluid admitted through a nozzle 133. In practice, the operation of the microsystem 2 is reversible. In particular, in this mode of operation, the transducers 38 and 39 are used to convert electrical energy supplied, for example, from the device 34, into mechanical displacements of the mobile parts 12 and 14. In these conditions, care will also be taken to ensure that the reciprocal displacements of the mobile parts 12 and 14 are phase-shifted by $\pi/2$. The expanded fluid is then admitted through the nozzle 133, corresponding to the nozzle 8, and the compressed fluid is expelled through the nozzle 6.

The fluid compressed by the microsystem 132 is expelled into a combustion chamber 134 of the micromotor. Here, the compressed fluid is an inflammable mixture of fuel and oxidant. In the chamber 134, this inflammable mixture explodes, which produces exhaust gases that are even more compressed. The exhaust gases are then admitted through the nozzle 6 into the microsystem 2 which converts the duly created pressure difference into a mechanical movement then into electrical energy. The electrical energy is then used to power a load connected to the terminals of the fuel cell. This load has not been represented. The expanded exhaust gases are expelled through the nozzle 8.

FIG. 14 represents an electronic chip 140 equipped with microchannels 142 produced inside the substrate which supports electronic components 144 such as transistors. The microchannels 142 have an input mouth 146 and an output mouth 148. A heat transfer fluid 148 circulates from the mouth 146 to the mouth 148.

In this embodiment, a microsystem 150 for compressing the heat transfer fluid is connected between the mouths 146 and 148. This microsystem 150 is, for example, identical to the microsystem 132.

The microchannels 142 form an expansion vessel or expansion valve such that the compressed heat transfer fluid expelled by the microsystem 150 into the mouth 146 expands in the microchannels which makes it possible to cool the electronic components. Then, this heat transfer fluid returns into the microsystem 150 through the mouth 148 to be recompressed.

Thus, it is possible to effectively and simply cool the electronic chip 140.

FIGS. 15 to 21 represent different alternative embodiments of a reinforcement for the distal portions 16, 17. To simplify these figures, the same schematic representation as that adopted for FIG. 5 is used.

Figure 15:
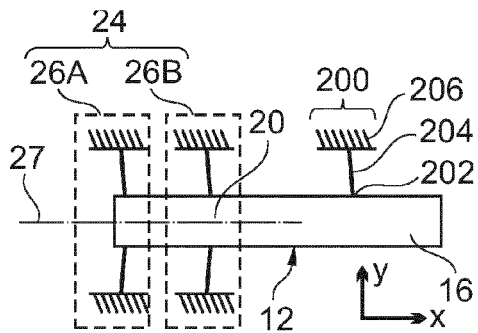

In FIG. 15, the reinforcements 70 and 72 are replaced by a single reinforcement 200. Unlike the reinforcements 70 and 72, this reinforcement 200 is not received inside a housing hollowed out in the distal portion 16. On the contrary, this reinforcement 200 is here directly mechanically connected to the periphery of the distal portion 16. In this embodiment, the reinforcement 200 is formed by a blade 204, of which the distal end 202 is mechanically connected with no degree of freedom to the distal portion 16 and of which a proximal end 206 is mechanically connected with no degree of freedom to the plane 22.

Figure 16:
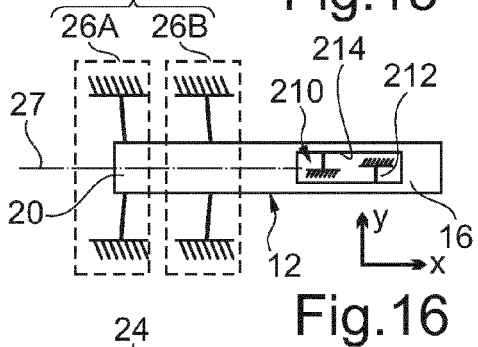

In the embodiment of FIG. 16, the reinforcements 70 and 72 are replaced by two reinforcements 210 and 212 received inside one and the same housing 214 hollowed out in the distal portion 16. For example, the reinforcements 210 and 212 are identical to one another except that they are arranged head-to-tail relative to one another inside the housing 214. For example, the structure of these reinforcements 210 and 212 is identical to the structure of the reinforcement 70. Thus, in this embodiment, these reinforcements 210 and 212 are produced using flexible blades anchored on one side to the plane 22 and on the other side to the distal portion 16. Such an embodiment increases the linearity of the displacement of the distal portion 16 in the direction X.

Figure 17:
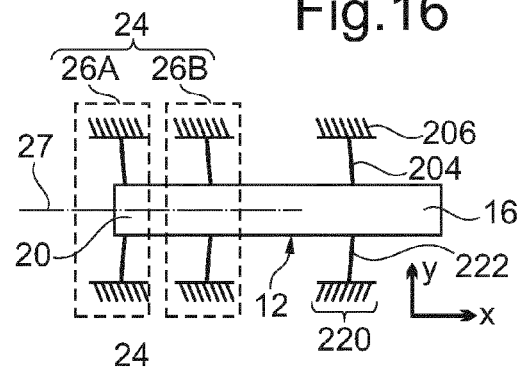

The embodiment of FIG. 17 is identical to the embodiment of FIG. 15 except that the reinforcement 220 comprises a blade 222 symmetrical to the blade 204 relative to the sliding axis 27. The blades 204 and 222 are inclined relative to the direction Y on the same side so that these blades always work in pulling mode in normal operation. The blade 222 is fastened to the plane 22 and to the distal portion 16 like the blade 204. The addition of the blade 222 makes it possible to improve the displacement of the distal portion 16 in the direction X.

Figure 18:
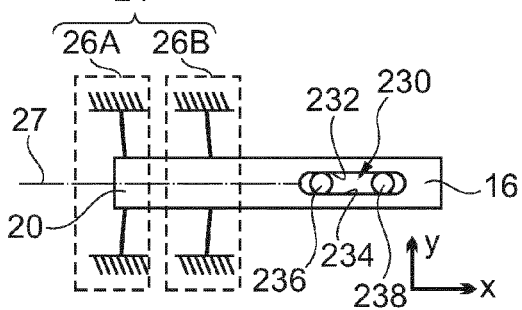

In the embodiment of FIG. 18, the housing 78 is replaced by an oblong housing 230 extending essentially along the sliding axis 27. This housing 230 has two parallel faces 232 and 234. The faces 232 and 234 are at right angles to the plane 22 and parallel to the sliding axis 27. They are opposite one another. A guide is received inside this housing 230 and fastened with no degree of freedom to the plane 22. In this embodiment, the guide is embodied by two guiding pins 236, 238. These pins 236, 238 protrude vertically from the plane 22 inside the housing 230. Each of these pins is in sliding contact on both sides with the faces 232 and 234. Thus each pin forms spot links with each of the faces 232, 234, the normal of which at the point of contact is at right angles to the axis 27.

Figure 19:
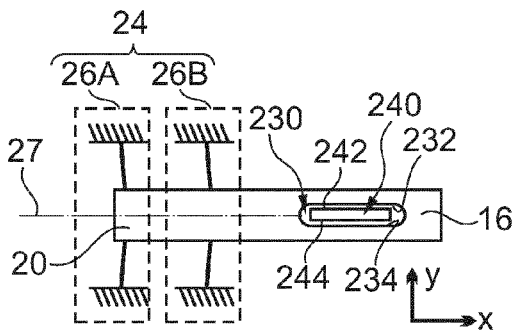

The embodiment of FIG. 19 is identical to the embodiment of FIG. 18 except that the guide is no longer produced by guiding pins 236, 238 but by a guiding plate 240. The plate 240 protrudes into the housing 230. This plate 240 extends essentially parallel to the sliding axis 27. More specifically, this plate 240 has two opposing faces 242 and 244 parallel to the axis 27 and at right angles to the plane 22. These faces are in sliding contact with the faces 232 and 234 of the housing 230 to guide the distal portion 16 in translation in the direction X. In this figure, the gap that exists between the faces 232, 234, 242 and 244 has been exaggerated to increase its legibility.

FIG. 20 represents an embodiment in which the guide is not received inside a housing hollowed out in the distal portion but situated outside this distal portion 16. In this embodiment, the guide consists of three guiding pins 250 to 252. Each of these guiding pins 250 to 252 is in sliding contact on external faces of the distal portion 16. These external faces are at right angles to the plane 22. Thus, each guiding pin forms at least one spot link, the normal of which at the point of contact is at right angles to the sliding axis 27.

The pins 250 to 252 are arranged relative to one another so as to block the degree of freedom in rotation of the distal portion 16 about a vertical axis.

In the embodiment of FIG. 21, the reinforcement is produced in a way similar to what was described with reference to FIG. 20 except that the pins 250 to 252 are replaced by guiding plates 260 and 262. The plates 260, 262 are situated on either side of the distal portion 16 and in sliding contact on the external faces of this distal portion 16.

FIG. 22 represents a microsystem 300 for converting a pressure difference in a fluid into a mechanical displacement. To this end, this microsystem 300 is, for example, identical to the microsystem 2 except that the mobile parts 12 and 14 are replaced by, respectively, mobile parts 302 and 304. The parts 302, 304 differ from the parts 12, 14 only in that their overhanging distal portions, respectively 306 and 308, are shaped in a circle and not in a spiral. More specifically, the distal portion 306 is here a circle hollowed at its center. The distal portion 308 is a circle hollowed at its center and having a vertical slot 310. Thus, the horizontal section of the portion 308 is in the form of a "C". The distal portion 306 is housed inside the central void of the distal portion 308. The proximal portion 20 of the part 302 is housed inside the slot 310.

The fluid input and output nozzles 6 and 8 are placed, respectively, to the right and to the left of the proximal portion 20 and inside the space formed between the outer periphery of the portion 306 and the inner periphery of the portion 308.

The parts 302 and 304 are displaced, relative to the top and bottom planes, only in translation in, respectively the directions X and Y. To this end, the links 24 and 25 are used.

The thickness of the vertical walls of the distal portions 306, 308 is small. Consequently, the distal portion 308 is associated with reinforcements 312 and 314 which limit its deformation in the direction X under the effect of the fluid which is flowing between the parts 302 and 304 while allowing its translation in the direction Y. For example, these reinforcements are arranged on either side of the proximal portion 20. Here, these reinforcements are placed outside the central void of the portion 308. They are produced as described previously. Here, they are produced as the reinforcement 70. Preferably, the end of each blade of each reinforcement 312 and 314 is located closer to the slot 310 than the proximal portion 21.

Optionally, the distal portion 306 is also associated with a reinforcement 316 which limits its deformation in the direction Y under the effect of the fluid which is flowing between the parts 302 and 304 while allowing its translation in the direction X. For example, this reinforcement 316 is also produced as described for the reinforcement 70. Here, it is housed inside the central void of the portion 306.

For example, the other elements necessary to the operation of the microsystem 300 are identical to those already described with reference to the microsystem 2. To simplify FIG. 22, they have not been represented.

When the microsystem 300 is operating, the outer periphery of the distal portion 306 is in contact, along a vertical line of contact 320, against the inner periphery of the distal portion 308. The parts 302 and 304 are displaced by the fluid which flows from the nozzle 6 to the nozzle 8. In these displacements, the line of contact 320 sweeps the inner periphery of the distal portion 308, here in the counter-clockwise direction. This circular movement defines a pocket of fluid which moves away from the nozzle 6 and towards the nozzle 8 while increasing in volume.

In FIG. 22, the dimensions of the space between the distal portions 306 and 308 have been exaggerated to make this figure more legible. However, in reality, this space is much smaller such that the width in the direction X of the slot 310 is much smaller. By reducing the width of the slot 310, the possible leaks of fluid through this slot are limited.

The microsystem 300 can also be used to compress a fluid. In this case, it must be provided with actuators suitable for displacing the parts 302 and 304.

Many other embodiments are possible. For example, the mobile parts can be mechanically prestressed so that, whatever the position of these mobile parts, there is always at least one elastic link 24 or 25 which has a non-zero elongation, that is to say that it is not in its rest position.

Many other forms are possible for the distal portions of the mobile parts. For example, the spiral can be produced differently. It can be a volume, an Archimedean spiral, a square spiral, or even a spiral with reversed portions. Each mobile part may comprise one or more spirals. Nor are the distal portions 306 and 308 necessarily circles. For example, their horizontal transversal section may be an ellipse.

As a variant, one of the mobile parts is fastened with no degree of freedom onto the substrate and only the other part is mobile and is displaced so as to displace one or more pockets of fluid in a way identical to what was described with regard to FIG. 3 or 22. In this embodiment, the link of the mobile part allows a translational displacement both in the directions X and Y. For example, the fastened part is produced by etching a layer deposited on the substrate but not on a sacrificial layer as is the case for the mobile part. In this case, if reinforcements are used to guide the mobile part, these reinforcements at the same time allow the translation of the distal portion in the directions X and Y.

Other embodiments are possible for the links 24 and 25. For example, the links 24 and 25 can be produced using a flexible blade, a ball joint, a sliding bearing or similar, and a combination thereof.

The compressed fluid can be obtained from a combustion or not. In the latter case, the compressed fluid may be obtained from a tank of compressed fluid. For example, in the embodiment of FIG. 13, the microsystem 132 and the combustion chamber 134 are replaced by a tank of compressed fluid. A cell generating electricity from the expansion of the compressed fluid stored in the tank is thus obtained. Preferably, all of the components of the cells described here are housed in one and the same box from which protrude terminals for electrical connection to an external electrical circuit. Typically, this box is removable to allow for easy replacement of the cell in the external electrical circuit. These terminals are therefore suitable for cooperating with corresponding electrical terminals of the external electrical circuit to be electrically connected and, alternatively, disconnected from, this circuit.

It is not necessary for the mobile parts to be mounted in translation along perpendicular axes. In fact, it is sufficient for the axes along which the mobile parts are displaced to be non-parallel. If the angle between these axes is different from $\pi/2$ radians, then the phase-shift between the oscillation movements of the mobile parts must be adapted accordingly.

Nor is it necessary for the mobile parts to work at the resonance frequency.

In a simplified embodiment, the mechanical phase-shifter 36 can be omitted. In this case, predetermined phase-shift between the movements of the mobile parts can be ensured by an electric actuator such as, for example, an electromechanical transducer.

The mechanical phase-shifter can also be produced without employing a spring. For example, it can be produced using a connecting rod and crank mechanism.

For the conversion of a pressure difference into a mechanical displacement, the conversion of the duly produced mechanical energy into electrical energy is optional. In practice, for the system 2 to function, it is sufficient to have controllable dampers making it possible to lock the displacements of the mobile parts in order to maintain the appropriate phase-shift.

The electrical energy produced from the displacements of the mobile parts is not necessarily used to power the unit 36 or other associated electronic components such as the components of the sensor 100.

Many other ways of manufacturing the microsystem 2 are possible. In particular, the etching steps can be replaced by deposition steps. Similarly, the use of a sacrificial layer can be omitted. In this case, other steps making it possible to simultaneously fabricate the two mobile parts interleaved one inside the other are omitted. For example, the two mobile parts are fabricated by hollowing out, in one and the same substrate, through slots defining these mobile parts and the space between these mobile parts. One end of each mobile part is left fastened to the substrate. Plates are then hermetically bonded onto each face of the substrate to seal the cavity in which the fluid expands between the mobile parts or is compressed between the mobile parts.

The number of reinforcements present in the microsystem 2 is adapted to the situation. For example, the number of reinforcements for each distal portion can be equal to one or strictly greater than 2. This number may be the same or different from one distal portion to another.

The reinforcement may be fastened to both the plane 22 and the top plane.

When the reinforcement is produced from a flexible blade, the proximal end of this flexible blade can be fastened either to the bottom plane 22 or to the top plane.

The reinforcements can be omitted if the pressure which is exerted on the distal portion is low enough not to provoke the deformation of this distal portion likely to result in a mechanical blocking of the microsystem 2.

Finally, in the embodiments of the sensors, electronic chips, micromotors and cells described above, the microsystem 2 can be replaced by another microsystem for converting a pressure difference in a fluid into a mechanical displacement or vice versa. For example, the microsystem 2 is replaced by the microsystem 300 or a microsystem comprising a turbine to convert the pressure difference into a mechanical displacement.

The invention claimed is:

1. An apparatus comprising a microsystem for converting a pressure difference in a flowing fluid into a mechanical displacement according to the principle of an expansion valve, wherein said microsystem comprises an input nozzle for receiving said fluid, said fluid being a compressed fluid at said input nozzle, an output nozzle for outputting said fluid, said fluid being an expanded fluid at said output nozzle, at least two parts, at least one of which is a mobile part, between which said fluid flows to pass from said input nozzle to said output nozzle by displacing said at least two parts relative to one another, said at least two parts being shaped and interleaved one inside the other so that, during displacement thereof, said at least two parts define at least one pocket of fluid that concurrently increases in volume and moves away from said input nozzle to then meet said output nozzle, a top plane and a bottom plane between which said mobile part is inserted, said top plane and said bottom plane containing between said at least two parts said fluid, said mobile part being mounted to be able to be displaced relative to each of said top and bottom planes, said mobile part comprising an overhanging distal portion along which said fluid flows, said overhanging distal portion forming a shaped portion of said mobile part, and a proximal portion mechanically linked to a selected plane via a link allowing only a translational displacement of said proximal portion in a longitudinal direction, wherein said selected plane is selected from the group consisting of said bottom plane and said top plane, and at least one reinforcement, said at least one reinforcement comprising a first side fastened to at least one of said top and bottom planes and, a second side that is at least one of fastened to and in sliding contact with said overhanging distal portion of said mobile part to limit deformation thereof in a transverse direction at right angles to said longitudinal direction.

2. The apparatus of claim 1, wherein said microsystem further comprises at least one transducer suitable for converting mechanical energy produced by displacement of said mobile part into a second form of energy.

3. The apparatus of claim 1, wherein said overhanging distal portion of said mobile part comprises a housing inside which said reinforcement is received.

4. The apparatus of claim 1, wherein said reinforcement comprises at least one flexible blade extending mainly in said transverse direction, said flexible blade having a proximal end fastened with no degree of freedom to at least one of said top plane and said bottom plane, and a distal end fastened with no degree of freedom to said overhanging distal portion of said mobile part.

5. The apparatus of claim 4, wherein said reinforcement comprises at least two flexible blades that are symmetrical relative to an axis parallel to said longitudinal direction and inclined on the same side of an axis parallel to said transverse direction to work only in pulling mode during displacement of said mobile part.

6. The apparatus of claim 1, wherein said reinforcement comprises at least one guide fastened with no degree of freedom to at least one selected plane, said selected plane being selected from the group consisting of said top plane and said bottom plane, and extending at right angles to said selected plane, and wherein said overhanging distal portion has a planar face at right angles to said transverse direction and in sliding contact with said at least one guide.

7. The apparatus of claim 1, wherein said at least two parts are mobile relative to said top and bottom planes in respective non-collinear longitudinal directions.

8. The apparatus of claim 7, wherein said microsystem comprises a mechanical phase shifter inserted between said at least two mobile parts to introduce a phase shift between reciprocal displacements of said at least two mobile parts.

9. The apparatus of claim 1, further comprising at least one link between said at least two parts, said at least one link forming, with said at least two parts, a system that is resonant at a resonance frequency, and a unit for controlling displacement of each mobile part, said unit being programmed to lock a frequency of reciprocal movements of each mobile part at said resonance frequency.

10. The apparatus of claim 9, wherein said link comprises a spring, each end of said spring being mechanically connected to a mobile part.

11. The apparatus of claim 1, wherein said overhanging distal portion is shaped as a spiral.

12. The apparatus of claim 1, wherein said overhanging distal portion is shaped as a circle.

13. An apparatus comprising a microsystem for compressing a flowing fluid, wherein said microsystem comprises an input nozzle for receiving said fluid and an output nozzle for discharging said fluid, wherein said fluid at said input nozzle is an expanded fluid and said fluid at said output nozzle is a compressed fluid, at least two parts, at least one of which is a mobile part, between which said fluid flows as it passes from said input nozzle to said output nozzle by displacing said at least two parts relative to one another, said at least two parts being shaped and interleaved one inside the other so that, during displacement thereof, said at least two parts define at least one pocket of fluid that concurrently reduces in volume as it moves away from said input nozzle to then meet said output nozzle, a top plane and a bottom plane between which said mobile part is inserted, said top plane and said bottom plane containing between, said at least two parts, said fluid, wherein said mobile part is mounted to be able to be displaced relative to each of said top plane and said bottom plane, and wherein said mobile part comprises an overhanging distal portion along which said fluid flows, said overhanging distal portion forming said shaped portion of said mobile part, and a proximal portion mechanically linked to one of said bottom plane and said top plane via a link allowing only a translational displacement of said proximal portion in a longitudinal direction, an actuator configured to displace said mobile part, and a reinforcement having a first and second side, wherein said reinforcement is fastened, on said first side, to at least one of said planes and, wherein, on said second side, said reinforcement is one of fastened to and in sliding contact with said overhanging distal portion of said mobile part to limit deformation thereof in a transverse direction at right angles to said longitudinal direction.

14. The apparatus of claim 13, further comprising a transducer suitable for converting energy external to said microsystem into mechanical energy for displacement of said mobile part.

15. The apparatus of claim 13, wherein said overhanging distal portion of said mobile part comprises a housing inside which said reinforcement is received.

16. The apparatus of claim 13, wherein said reinforcement comprises at least one flexible blade extending mainly in said transverse direction, said flexible blade having a proximal end fastened, with no degree of freedom, to at least one of said top plane and said bottom plane, and a distal end fastened, with no degree of freedom, to said overhanging distal portion of said mobile part.

17. The apparatus of claim 13, wherein said reinforcement comprises at least one guide fastened, with no degree of freedom, to at least one selected plane, said selected plane being selected from the group consisting of said top plane and said bottom plane, and extending at right angles to said selected plane, and wherein said overhanging distal portion has a planar face at right angles to said transverse direction and in sliding contact with said at least one guide.

18. The apparatus of claim 13, wherein said at least two parts are mobile relative to said top and bottom planes in respective non-collinear longitudinal directions.

19. The apparatus of claim 13, further comprising at least one link between said at least two parts, said at least one link forming, with said at least two parts, a system that is resonant at a resonance frequency, and a unit for controlling displacement of each mobile part, said unit being programmed to lock a frequency of reciprocal movements of each mobile part at said resonance frequency.

\* \* \* \* \*